United States Patent [19]
Kovin et al.

[11] 4,048,011
[45] Sept. 13, 1977

[54] FAST NUCLEAR REACTOR

[76] Inventors: Vladimir Mikhailovich Kovin, ulitsa Shalyapina, 19, kv. 11; Fedor Mikhailovich Mitenkov, ploschad Gorkogo, 2, kv. 26; Alexandr Vasilievich Ovechkin, ulitsa Tolbukhina, 6, kv. 2; Vladimir Alexeevich Pankratov, ulitsa Kultury, 3, kv. 456; Nikolai Ivanovich Savin, ulitsa Zvezdinka, 3, kv. 74; Tamara Alexandrovna Ternikova, prospekt Kirova, 2, kv. 63; Vladimir Jurievich Filippov, ulitsa Piskunova, 32, kv. 14; Dmitry Alexandrovich Khramov, ulitsa Kultury, 3, kv. 425; Evgeny Naumovich Chernomordik, ploschad Gorkogo, 2, kv. 30; Vladimir Ivanovich Shiryaev, ulitsa Strazh Revoljutsii, 22, kv. 19; Vladimir Romanovich Muzychuk, pereulok Timurovsky, 21; Alexandr Nikolaevich Savin, ulitsa Zvezdinka, 3, kv. 71, all of Gorky, U.S.S.R.

[21] Appl. No.: 505,794

[22] Filed: Sept. 13, 1974

[51] Int. Cl.$^2$ .............................................. G21C 15/02
[52] U.S. Cl. .......................................... 176/40; 176/61; 176/65; 176/87
[58] Field of Search ...................... 176/40, 52, 61, 62, 176/63, 64, 65, 87, DIG. 3

[56] References Cited

U.S. PATENT DOCUMENTS

| 3,008,889 | 11/1961 | Junkins | 176/DIG. 3 |
| 3,042,601 | 7/1962 | Loeb | 176/62 |
| 3,105,805 | 10/1963 | Rodwell | 176/85 |
| 3,293,137 | 12/1966 | Hutchinson et al. | 176/40 |
| 3,325,374 | 6/1967 | Margen | 176/65 |
| 3,715,270 | 2/1973 | Jackson | 176/40 |
| 3,719,558 | 3/1973 | Leclou | 176/65 |
| 3,784,443 | 1/1974 | Vercasson | 176/62 |
| 3,802,994 | 4/1974 | Forster et al. | 176/65 |

FOREIGN PATENT DOCUMENTS

| 1,210,498 | 2/1966 | Germany | 176/61 |

Primary Examiner—Samuel W. Engle
Assistant Examiner—S. A. Cangialosi
Attorney, Agent, or Firm—Holman & Stern

[57] ABSTRACT

The herein proposed fast nuclear reactor comprises a vessel, a liquid metal coolant filling said vessel, the side wall of which is cylindrical in shape and has its axis disposed in a horizontal plane. The vessel accommodates a core and heat exchangers with said liquid-metal coolant being passed therethrough by means of forced circulation thereof. The space above the coolant level is occupied by an inert gaseous medium, with the coolant contacting said medium in pipe branches penetrating the side wall of the vessel.

5 Claims, 4 Drawing Figures

FAST NUCLEAR REACTOR

The present invention relates to nuclear reactors, and more particularly to fast nuclear reactors for use, essentially, in nuclear power plants as well as in water-distillation plants as a source of thermal energy.

BACKGROUND OF THE INVENTION

A fast nuclear reactor is known in the art having a vessel filled with a liquid-metal coolant contacting an inert gas and which passes through the reactor core and heat exchanger ducts by a coolant circulating means.

In this reactor, the core, the coolant circulating means and heat exchangers are all accommodated in the vessel which is closed by a lid. The reactor vessel is partially filled with a coolant and the space above the level thereof is occupied by an inert gas. The side wall of said reactor vessel is cylindrical in shape and its axis lies in a vertical plane. The cross-sectional shape of the vessel is elliptical.

Other nuclear reactors, similar to the one described above, are known with the cross-sectional shape of the vessel whereof is thereof being circular or oval.

In such reactors, the lid of the vessel is rigidly attached to its side wall, and is made in the form of a flat plate. The lid is also employed to support the coolant circulating means as well as the means for recharging the core and heat exchangers.

In all of the above-mentioned reactors, designing a lid capable of supporting equipment and instrumentation as well as withstanding sharp temperature fluctuations under various operating conditions of the reactor is a difficult engineering problem. As far as robustness is concerned, a flat lid and a vessel having an oval or elliptical cross-sectional shape are the least robust, and cannot preserve their original shape both under various operating conditions of the reactor, and especially in the case of an accidental pressure jump inside the vessel.

The inert gaseous medium, which in the reactor vessel of the above described design occupies the space between the lid and the coolant level, serves as a heat-insulating blanket. The fact that the coolant-inert gas interface is inside the vessel itself may bring about temperature disbalance between those portions of the vessel which are in contact with the coolant and those that are in contact with the inert gas due to different thermal expansions of these portions. In order to eliminate the resulting thermal stresses requires the provision of highly efficient and reliable heat-insulating means at these portions, particularly in the area of attachment of the lid to the vessel.

SUMMARY OF THE INVENTION

It is an object of the present invention to provide a fact nuclear reactor in which the temperature is evenly distributed over the entire reactor vessel, with the vessel being made more robust.

This object is attained by the fact that in a fast nuclear reactor, with the vessel is filled with a liquid-metal coolant contacting an inert gas medium, and being made to pass through the reactor core and heat exchanger tubes by means of forced circulation of said coolant; the side wall of the vessel is, according to the invention, cylindrical in shape, its axis lies in a horizontal plane, and pipe branches penetrating the side wall, in which the liquid-metal coolant contacts the inert gas medium.

It is expedient that the vessel have a circular cross-sectional shape.

It is also expedient that the reactor have an additional vessel, tubular in shape, arranged internally of the main vessel with an annular space therebetween for the coolant to pass therethrough from the heat exchangers to the means for forcing circulation of the coolant.

The side wall of the vessel should preferably be made stepped with one of the extreme steps having a smaller perimeter for placing the means for forced circulation of the coolant thereon.

The heat exchanger tubes should preferably be arranged parallel to the axis of the vessel.

It is advisable that the reactor be provided with a means for moving the reactor core along the axis of the vessel.

The design of the proposed fast nuclear enhances the robustness and tightness of its vessel, thus improving temperature distribution in the reactor, and simplifying the process of assembling the reactor.

BRIEF DESCRIPTION OF THE DRAWINGS

The invention will now be described in greater detail with reference to preferred embodiments thereof, taken in conjunction with the accompanying drawings, wherein.

DESCRIPTION OF THE PREFERRED EMBODIMENTS

Figure 1:
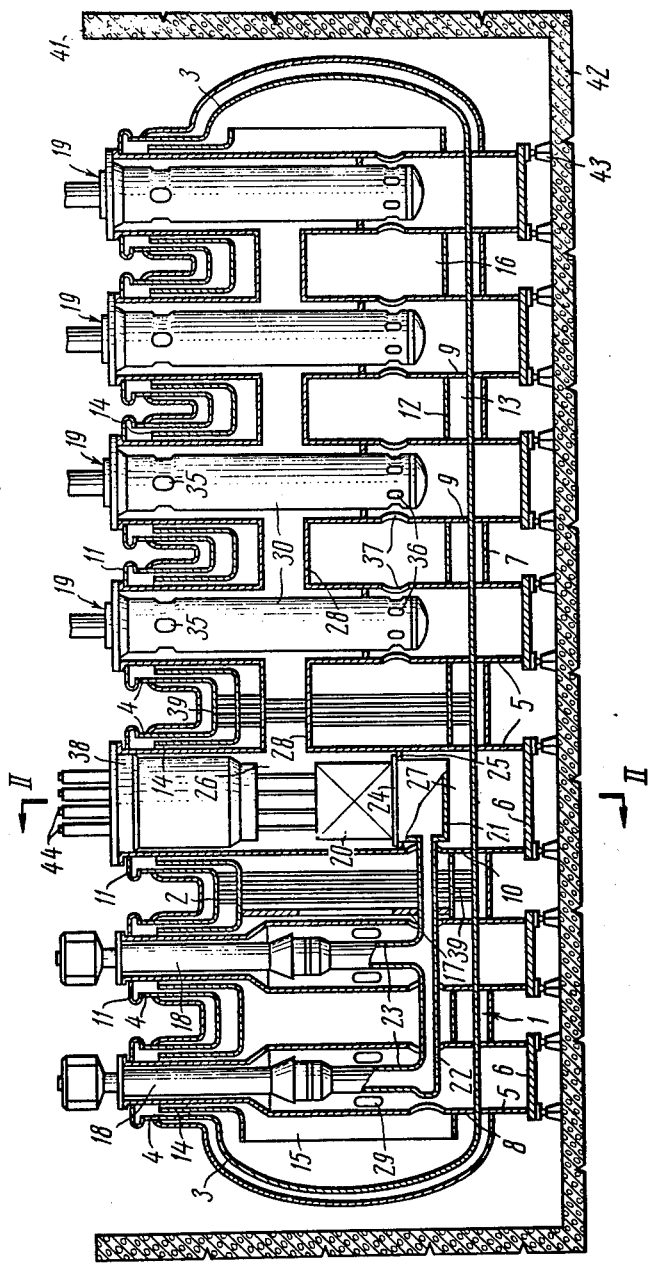
FIG. 1 illustrates an embodiment of the proposed fast nuclear reactor, the longitudinal section.
Figure 2:
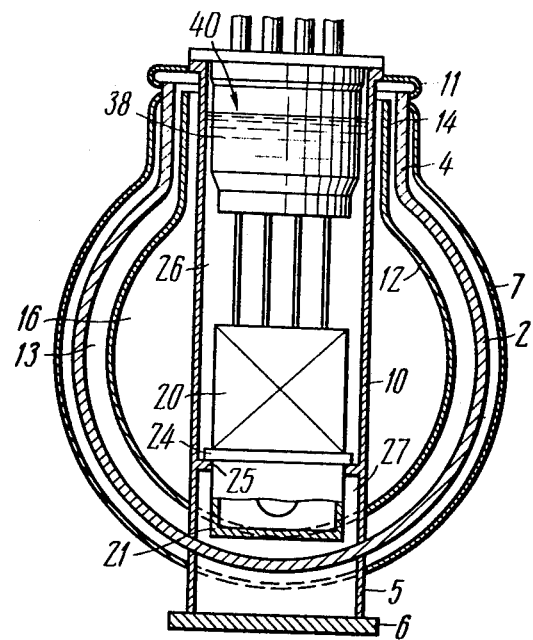
FIG. 2 is a section view taken along line II—II of FIG. 1.

Referring now to the drawings, the fast nuclear reactor comprises a vessel 1 (FIG. 1) having a side wall 2 which is cylindrical in shape and whose axis lies in a horizontal plane. The side wall 2 is circular in cross section (FIG. 2). The end surfaces of the side wall 2 are covered by plates 3. The top portion of the vessel 1 has pipe branches 4 made therein, and the bottom portion of the vessel is provided with bearing members 5 resting on a plate 6. The main vessel 1 with the pipe branches 4 is enveloped by a protective casing 7 welded to the bearing members 5.

Welded to the bottom portion of the side wall 2, inside the vessel 1, at the points of contact between the side wall 2 and the bearing members 5 are bearing sleeves 8, 9 and 10 which pass through the pipe branches 4 and are joined therewith by means of flexible toroidal members 11 designed to compensate for the difference in thermal expansion of the bearing sleeves 8, 9 and 10 and the vessel 1. The protective casing 7 is tightly sealed to the pipe branches 4 in its top portion.

The vessel 1 accommodates an additional vessel 12 with an annulus 13 being formed between said additional vessel and the side wall 2 of the vessel 1. In its bottom portion, the additional vessel 12 is secured to the bearing sleeves 8, 9 and 10, while its top portion is provided with cylindrical ferrules 14 disposed in the gap between the pipe branches 4 and the bearing sleeves 8, 9 and 10.

The additional vessel 12 is divided into chambers 15 and 16 by a transverse annular partition 17 arranged between the bearing sleeves 8 and 10.

Placed inside the bearing sleeves 8 are means for circulating the coolant, which, in the embodiment under consideration, are in the form of centrifugal pumps 18. Placed inside the bearing sleeves 9 are heat exchangers 19, and the sleeve 10 accommodates a core 20 with plenum chamber 21. The plenum chamber 21 communicates through a pressure pipe 22 with pipes 23 of the pumps 18 and has its flange 24 joined with a collar 25 of the bearing sleeve 10, dividing thereby its inner space into a top and a bottom spaces 26 and 27, respectively. The top space 26 communicates with the inner space of the bearing sleeves 9 through ducts 28. The inner space of the sleeves 8 communicates with that of the additional vessel 12 through ports 29.

Figure 3:
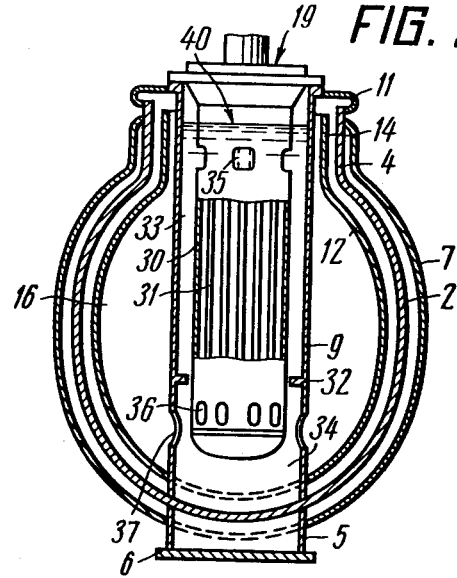
FIG. 3 is a cross-section view taken along the longitudinal axis of a heat exchanger in a fast nuclear reactor whose vessel is elliptical in cross section.

The heat exchangers 19 are made in the form of tubes 31 (FIG. 3) vertically arranged inside a cylindrical casing 30. The inner space of the sleeves 9, each accommodating a heat exchanger 19, are divided by a collar 32 into a top and a bottom spaces 33 and 34, respectively. The top space 33 communicating with the inner space of the sleeve 1 (FIG. 10) also communicates with the inner space of the casing 30 through ports 35. The bottom space 34 (FIG. 3) communicates with that of the casing 30 through ports 36 and with the inner space of the additional vessel 12 through ports 37.

The sleeve 10 (FIG. 1) is sealed by a plug 38, while the sleeves 8 and 9 are sealed, respectively, by the pump 18 and heat exchangers 19 placed therein.

A neutron shield 39 is arranged inside the vessel 1, in the space between the core 20 and the pump 18 on one side, and the heat exchanger 19 on the other.

The vessel 1 is filled with liquid-metal coolant which, in the proposed reactor, is sodium. The coolant is topped by an inert gas medium which, in this embodiment, is argon. The coolant level 40 (FIG. 2), i.e. the sodium-argon interface, is inside the ducts 4, which makes it possible to eliminate thermal stresses in the vessel 1, such as normally occur at the interface between two media possessing different thermal properties.

The nuclear reactor is placed in a protection box 41 (FIG. 1) and is mounted on foundation 42 therefor through the medium of roller bearings 43 contacting plates 6.

The core 20 of the reactor is recharged by removing the plug 38 with the plug 38 supporting a means 44 for controlling the operation of the core 20.

Another embodiment of the proposed reactor vessel 1 is possible, in which the side wall 2 (FIG. 3) is elliptical in cross section.

The herein disclosed fast nuclear reactor may have another embodiment similar to the one described above.

Figure 4:
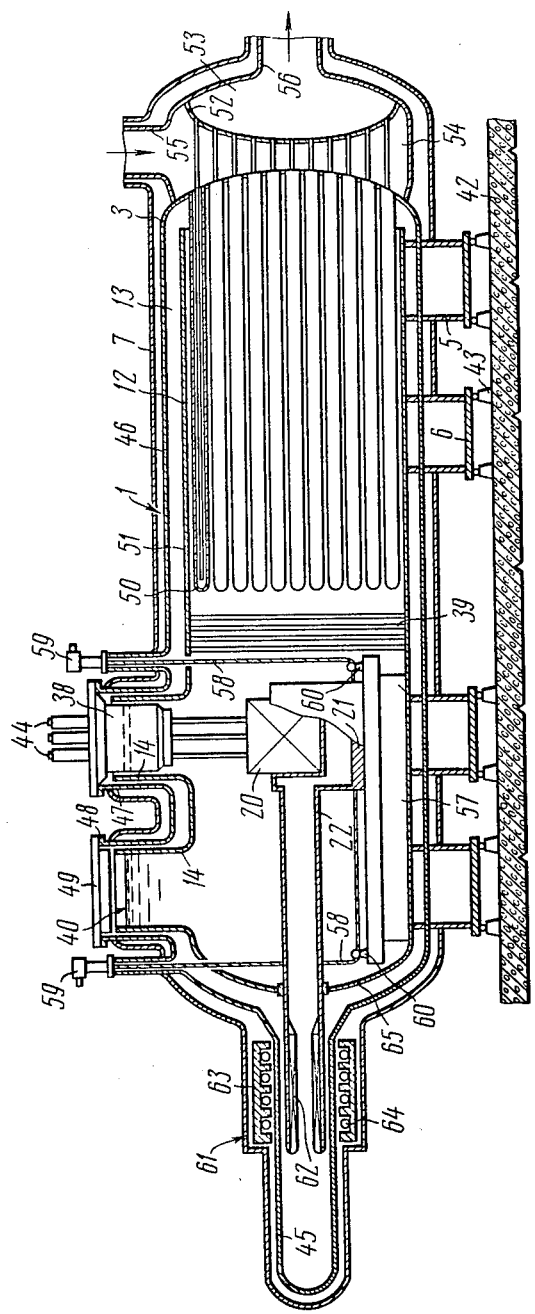
FIG. 4 illustrates another embodiment of the proposed fast nuclear reactor, the longitudinal section.

This embodiment differs from the above-described one in that the side wall 2 (FIG. 4) of the vessel 1 is of a stepped fashion with the first step 45 being smaller in perimeter than a second step 46.

The top portion of the step 46 is only provided with two pipe branches 47 and 48. The duct 47 is closed by the plug 38 with the core 20 being arranged thereunder and inside the vessel 1, with the core 20 being recharged through the pipe branch 48 covered by a detachable lid 49.

Arranged parallel to the axis of the vessel 1 of the reactor and inside the additional vessel 12, are the heat exchangers 19 made as two tubes 50 and 51, one inserted into the other. One of the ends of the outer tubes 50 is closed, and with their open ends the tubes 50 are encastred in the bottom 3 of the vessel 1, the bottom thus serving as a tube plate for the heat exchangers 19. Each tube 50 accommodates another tube, 51 forming an annulus therewith, with the pipe 51 being encastred in a tube plate 52 of an outlet chamber 53 for the coolant of the second loop. The chamber 53 is disposed in an inlet chamber 54, with the walls thereof being anchored to the bottom plate 3 of the vessel 1. The chambers 53 and 54 communicate through ducts 55 and 56 which deliver the coolant of the second loop to and from (as shown by arrows) the heat exchangers 19.

Inside the additional vessel 12, under the pipe branches 47 and 48, a platform 57 is mounted with the core 20 and plenum chamber 21 moving thereon. Joined to the chamber 21 is the pressure pipe 22, one end of which penetrates the step 45 of the side wall 2 of the vessel 1. In order to be recharged through the pipe branch 48, the core 20 is provided with a means for moving it along the axis of the vessel 1 over the platform 57. This means is made in the form of two cables 58 attached by both ends respectively, to the plenum chamber 21, and to two drums 59 mounted on the vessel 1, and creating the force required to move the core 20. The cables 58 pass through pulley blocks 60 mounted at the opposite ends of the platform 57, thereby ensuring movement of the core 20 along the axis of the vessel 1.

As the means for forced circulation of the coolant in the embodiment under consideration, an electromagnetic pump 61 is used, including an internal core 62 housed in the pressure pipe 22, and an external core 63 disposed on the side face of the step 45 together with a polyphase induction winding 64.

The end face of the additional vessel 12 on the side of the electromagnetic pump 61 is provided with a lateral partition 65 having a hole with the pressure pipe 22 passing therethrough.

As the neutron shield in this embodiment, a coolant layer between the core 20 and electromagnetic pump 61 is used.

The proposed fast nuclear reactor operates as follows.

The liquid-metal coolant heated in the core 20 (FIG. 1) is fed through the ducts 28 from the top space 26 of the bearing sleeve 10 to the top space 33 (FIG. 3) of each bearing sleeve 9. From the spaces 33, the coolant passing down through the ports 35 of the casings 30 of the heat exchangers 19 flows around the tube 31 and is cooled by the coolant of the second loop passing through these tubes 31. From the heat exchangers 19, the cooled coolant passes through the ports 36 of the casing 30 to the bottom space of the bearing sleeves 9, and further through the ports 37 to the chamber 16 (FIG. 1) of the additional vessel 12. From the chamber 16 of the additional vessel 12, part of the cooled coolant flows directly to the chamber 15 through the annular partition 17, and the rest of the coolant flows towards the open end of the additional vessel 12, and on into the annulus 13. While flowing through the annulus 13 along the entire vessel 1, the coolant cools down the latter. From the annulus 13, the coolant passes through the other open end of the additional vessel 12 into the chamber 15 wherefrom it passes through the ports 29 of the bearing sleeves 8 to the pipes 23 of the pumps 18, then to the pressure pipe 22 and on to the plenum chamber 21. The coolant emerging from the plenum chamber 21, and rises and passes through the core 20 where it is heated again.

From this moment on, coolant circulation and heating and cooling cycles repeat themselves.

The other embodiment described in this specification operates in a similar fashion.

There is a difference, though, residing in that the heated coolant flowing from the core 20 (FIG. 4) passes through the additional vessel 12 towards one of its open ends. As it flows between the tubes 50, the coolant of the first loop is cooled by that of the second loop passing through these tubes. The cooled coolant of the first loop emerges from the additional vessel 12 through its open end, and enters the annulus 13. From the annulus 13, the coolant flows further and enters the gap formed by the side face of the step 45 and the pressure pipe 22, wherefrom the coolant, flows by the electromagnetic pump 61, through the pressure pipe 22 into the plenum chamber 21 of the core 20 in which the coolant is heated.

The cold coolant of the second loop passes through the duct 55 into the inlet chamber 54 wherefrom it is distributed among the tubes 50, flowing wherethrough the coolant of the second loop cools the coolant of the first loop flowing around the tubes 50. From the pipes 50, the coolant enters the tubes 51 and flows therethrough and into the outlet chamber 53 from which it is then conducted through the duct 56.

From the moment on, the circulation of the coolants of both first and second loops, as well as the heating and cooling cycles, follow the same pattern.

In the proposed fast nuclear reactor, the side wall of the main vessel is cylindrical in shape, and its axis lies in a horizontal plane, which substantially increases its robustness. The coolant-inert gas interface has been removed from the vessel and into pipe branches accommodating various pieces of equipment, which offers a solution to a number of problems related to thermal stresses in the vessel.

The pumps, heat exchangers and the core in the bearing sleeves are placed so that their weight loads the foundation, which additionally enhances the robustness of the vessel. The arrangement of the electromagnetic pump and heat exchanger tubes horizontally also enhances the robustness and tightness of the vessel by virtue of the fact that the number of pipe branches in the top portion of its side wall has been minimized.

The proposed shape of the reactor vessel enables the movable core to be more efficiently utilized and rules out the possibility of the vessel losing its leak tightness as a result of removing the plug supporting the means for controlling the operation of the core, as well as eliminating the possibility of radioactive contamination during recharging.

What is claimed is:

1. A fast nuclear reactor comprising: a main vessel; a side wall of said main vessel being cylindrical in shape; the axis of said cylinder lying in the horizontal plane; at least two pipe branches penetrating said side wall of said vessel; a nuclear reactor core within said main vessel; heat exchangers comprised of tubes are also disposed within said main vessel; a liquid metal coolant filling said vessel and in said pipe branches; a means for circulating said liquid-metal coolant passing through said core and heat exchanger tubes; and an inert gas medium in said pipe branches and contacting said coolant therein; said reactor further including an additional tubular vessel arranged internally of said main vessel and surrounding said core and said heat exchangers; and an annulus defined between said vessels to form a conduit for the coolant to pass through in a direction from said heat exchanger towards said means for circulating the coolant.

2. The nuclear reactor as claimed in claim 1 wherein said side wall of said vessel is stepped, the smallest perimeter step of said side wall being designed to accommodate said means for circulating the coolant.

3. The nuclear reactor as claimed in claim, 2 wherein said tubes of said heat exchangers are arranged parallel to the axis of said vessel.

4. The nuclear reactor as claimed in claim 2, wherein said core is provided with a means for moving it along the axis of said vessel.

5. The nuclear reactor as claimed in claim 3, wherein said core is provided with a means for moving it along the axis of said vessel.

* * * * *